Sept. 26, 1961 H. SCHÄFER 3,001,255
PLASTIC BUTTON WITH THROUGH-PATTERN
Filed July 1, 1957

INVENTOR
Hans Schäfer
by:
Michael S. Striker
agt.

3,001,255
PLASTIC BUTTON WITH THROUGH-PATTERN
Hans Schäfer, Wuppertal-Barmen, Germany, assignor to Pfenning-Schumacher-Werke, Wuppertal-Barmen, Germany, a firm
Filed July 1, 1957, Ser. No. 669,209
Claims priority, application Germany Aug. 10, 1956
1 Claim. (Cl. 24—90)

The invention relates to plastic buttons with through-pattern. As a rule it is desired to obtain on these plastic buttons patterns as far as possible corresponding to those of buttons made from natural buffalo horn. Patterns which are restricted to the outer surfaces of plastic buttons which initially had a uniform appearance, do not meet these requirements. Consequently, buttons are often made with through-patterns, wherein the different materials from which the buttons are formed and which have a different appearance extend through the entire thickness of the buttons. In making such buttons rod-shaped bodies having a uniform pattern extending through their entire length are as a rule used as initial material, and these rods are divided into disc-shaped blanks which can be subjected to a final pressing operation. These rod-shaped bodies with a through-pattern can be made in various ways, whereby the known processes enable any desired through-patterns to be obtained and repeated at will. The appearance of the plastic or artificial horn buttons hitherto made in this manner, is practically exactly the same as the through-pattern of the rod serving as initial material, all the buttons produced from a certain rod pattern being exactly alike. Although these buttons have an appearance which might occasionally occur in the case of natural buffalo horn buttons, it is practically impossible when working buffalo horn to obtain a series of buttons all of which are of absolutely the same appearance. Therefore, the artificial horn buttons hitherto known do not as yet correspond in a satisfactory manner with the products obtained from natural buffalo horn.

The invention has for its object to provide an efficient method of producing artificial horn buttons with a through-pattern which resemble the natural buffalo horn buttons to a large extent.

This is attained substantially with artificial horn buttons having border zones of the sections of material of different appearance which extend through the thickness of the buttons at an oblique angle to their upper and lower surfaces or main surfaces, as they are called hereafter. Whereas in the case of the through-pattern plastic buttons hitherto known the border zones of sections of material of different appearance are, according to the method of production employed which uses rod-shaped bodies with a uniform pattern extending right through the entire length of the rods, at right angles to the main surfaces of the button, these border zones are, according to the invention, set at an incline to the longitudinal axis of the button and to the main surfaces thereof. By this means a pattern is obtained which differs from the through-pattern of the rod-shaped initial material and in which, while showing a similar run of the characteristic through-pattern lines, these lines are nevertheless distorted. Furthermore, stray or scattered sections also occur in the pattern such as are generally present in natural buffalo horn buttons because, in the case of buffalo horn, the cut surfaces determining the main surfaces of the buttons cannot all be so situated that they coincide with radial planes in relation to the longitudinal axis of the initial workpiece, when it must be remembered that buffalo horn cannot be compared with a rod with a uniform pattern extending through its entire length because the pattern zones, owing to the thickness of the horn diminishing towards the point, although being frequently similar are by no means identical at different points along the length of the horn.

The invention can be realized in a particularly simple manner in that the border zones of material sections of different appearance extend through the thickness of the button parallel to a plane or direction inclined at an oblique angle to its surface exposed to view. While it is possible to produce in the different sections of the button border zones of material of different appearance extending at different angles of inclination, such formations may lead to considerable technical difficulties in the manufacture so that it is simpler to allow the pattern to extend at an incline to the main surfaces in only one direction characteristic to the button. Experience has shown that it is possible with such constructions to imitate natural buffalo horn buttons so accurately that even experts find it difficult to tell the difference from the appearance. At the same time it is advisable to arrange the basic direction determining the course of the border zones through the button, at an angle of 10 to 45° to the side exposed to view, the sharper angles being preferred. In the case of buttons forming a set, it is also possible for the planes or directions determining the course of the border zones through the thickness of the button to be arranged at different angles to the main surfaces of the button so that the buttons constituting a series or set, although they may be similar are not identical in as far as the course of the through-pattern is concerned. Furthermore, in the case of sets of buttons, the planes or directions determining the course of the border zones through the button can be inclined at an oblique angle to the side of the button exposed to view in relation to changing reference lines or twisted positions of the pattern. At the same time the planes or directions determining the course of the border zones and the sides of the buttons exposed to view can in addition be set at various angles.

The invention can be particularly easily realized in that the parting surfaces of the rod-shaped initial body which form the main surfaces of the blanks are set at an oblique angle in relation to the longitudinal axis of the rod. It is then possible, as heretofore, to use rods having a uniform pattern extending through their entire length and to form therefrom disc-shaped blanks which are then pressed to shape. As compared with the prior known manner of working the only difference is that the parting surfaces, which substantially determine the main surfaces of the products, are not as heretofore in radial planes in relation to the longitudinal axes of the rods, but are inclined thereto. Since, when using rods having a circular cross-section, elliptical discs are produced by this manner of operation, it is advisable to divide these into several, preferably two initial bodies, each of which is then naturally subjected to the final shaping operation. It would, however, also be possible to take into consideration the cut inclined to the longitudinal axis of the rod by making the rod with a cross section deviating from the circular shape. Moreover, buttons with through-pattern according to the invention can also be produced by additionally turning the rod with uniform pattern throughout its length so that the course of the pattern is distorted to a varying extent in the individual sections and the inclinations of the border zones of sections of material of different appearance, which are the determining factor for the course of the through-pattern in the finished product, run differently in the pattern.

A preferred embodiment of the invention is illustrated by way of example in the accompanying drawing, in which.

Figure 1:
FIG. 1 is a cross-section of a plastic button with through-pattern.
Figure 2:
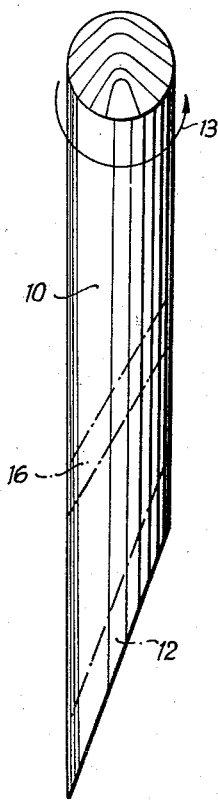
FIG. 2 shows an initial body in the form of a composite rod with pattern extending through its entire length, such as is used for the production of the button.
Figure 3:
FIG. 3 is an end view of the rod-shaped initial body.
Figure 4:
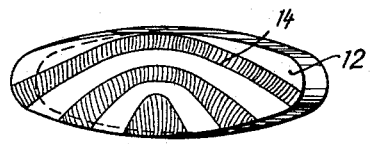
FIGS. 4 and 5 are top plan views of pressing blanks severed from the initial body.
Figure 5:
Figure 6:
FIG. 6 is a section on line VI—VI of FIG. 5.

The drawing shows an initial body or rod 10 which is made from powdery or pasty compositions or masses of different appearances and which may, according to FIG. 3, have particularly characteristic pattern lines 11 which indicate the border zones of sections of different appearance. As shown in FIG. 2, the rod 10 is cut up into pressing blanks 12 having main surfaces which are at an incline to the longitudinal axis of the rod. Such pressing blanks are shown individually in FIGS. 4 and 5 and differ from one another in that they are taken from the rod 10 in positions turned through an angle of 90° relatively to each other. This possibility of changing the course of the pattern is indicated by the arrow 13 in FIG. 2. From the section illustrated in FIG. 6 it will be seen that the characteristic pattern lines 11 extend through the thickness of the pressing blank 12 at an incline to the main surfaces thereof. Said blanks, possibly after being divided along line 14 (FIG. 4), are then finally pressed into buttons 15 similar to that shown in FIG. 1 in which the pattern lines 11 are inclined to the side exposed to view. By this means the products obtained have an appearance very similar to that of natural buffalo horn buttons. The pattern can moreover be varied in the case of sets of buttons, either by varying the angle at which the pressing blanks 12 are cut off the rod 10, as indicated in FIG. 2 by dot and dash lines at 16, or by turning the rod. As it is in every way possible to produce any desired number of rods 10 with the same through-pattern, such rods can each be divided uniformly over their entire length, either by turning them so that the lines of the pattern are mutually displaced, or by cutting along planes extending at different angles to the longitudinal axis of the rod, so as to obtain from a uniform basic pattern buttons which, when arranged in a set or series, have similar basic patterns yet are not entirely alike and in which the border zones of the sections of material of different appearance run at an oblique angle to the main surfaces of the buttons.

The embodiment illustrated shows only one method of production, however, many other methods are possible. There can be considerable freedom of choice in selecting the basic pattern. The buttons according to invention can also be made in different ways. For example discs or pressing blanks patterned at right angles to their main surfaces can be subjected to displacement parallel to their main surfaces so as to obtain a through-pattern at an oblique angle to said main surfaces.

Of course, various changes may be made in the details disclosed in the foregoing specification without departing from the invention and the claim annexed hereto.

I claim:

A button having substantially flat top and bottom faces and simulating buffalo horn material, said button consisting of a plurality of curved synthetic bodies of different appearance integral with each other and each extending throughout the thickness of said button under an oblique angle to the axis thereof, at least some of said curved synthetic bodies being of crescent shaped cross section, the lines of intersection of said curved synthetic bodies with said top and bottom faces respectively being differently located with respect to the axis of the button due to the oblique angle of extension of said bodies, whereby the configuration of the exposed portions of said bodies on both said faces is different in appearance.

References Cited in the file of this patent

UNITED STATES PATENTS

| | | |
|---|---|---|
| 11,176 | Platt | June 27, 1854 |
| 26,898 | De Forest | Jan. 24, 1860 |
| 234,322 | Noble | Nov. 9, 1880 |
| 235,799 | Naylor | Dec. 21, 1880 |
| 1,241,467 | Hastings | Sept. 25, 1917 |
| 1,521,888 | Kanoffsky | Jan. 6, 1925 |
| 1,660,726 | Stanforth | Feb. 28, 1928 |
| 1,695,816 | Noyes et al. | Dec. 18, 1928 |
| 2,306,587 | Broderson | Dec. 29, 1942 |

FOREIGN PATENTS

| | | |
|---|---|---|
| 12,553 | Great Britain | 1904 |